Aug. 16, 1938.  J. R. YANCEY  2,126,857
PIPE COUPLING
Filed Aug. 17, 1937  2 Sheets-Sheet 1
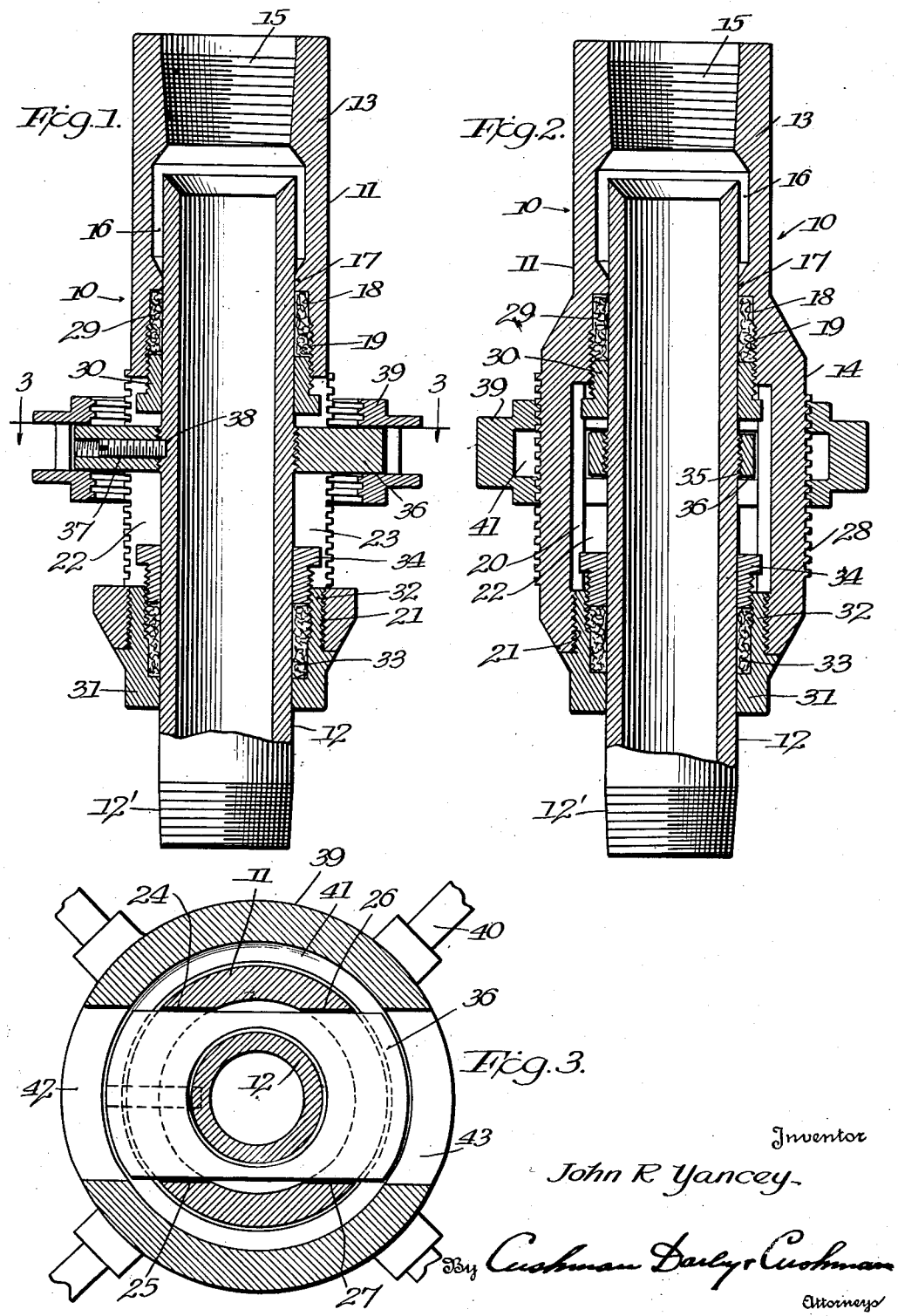
Inventor
John R. Yancey
By Cushman Darby & Cushman
Attorneys Patented Aug. 16, 1938

2,126,857

UNITED STATES PATENT OFFICE 2,126,857

PIPE COUPLING

John R. Yancey, Houston, Tex., assignor to Gray Tool Company, Houston, Tex., a corporation of Texas Application August 17, 1937, Serial No. 159,587

6 Claims. (Cl. 285—161)

The present invention relates to pipe couplings, and particularly to pipe couplings of variable length, thus obviating to a considerable extent the cutting of special lengths on the job. While the coupling of the present invention is of general application, I have illustrated its use, in the accompanying drawings, in a well head installation.

In bringing in a well, for example, it may be desired to flow for a time from both the casing and tubing through a common line to an oil separator. Different well head installations vary considerably, and heretofore in making the necessary connections special lengths have ordinarily had to be prepared on the job. After the well has cleared, the casing outlet need no longer be used and is discarded since it is of no use for any other installation. By the use of the coupling of the present invention, considerable time and labor is saved and the coupling may be readjusted and used on other installations. It is an object of the invention to provide such a coupling which is readily adjustable and safe in use.

I shall describe the invention with reference to the embodiment shown in the accompanying drawings in which:

Figure 1 is an axial section of the new coupling.

Figure 2 is an axial section of the new coupling taken at right angles to the section of Figure 1.

Figure 3 is a section substantially on line 3—3 of Figure 1, and

Figure 4:
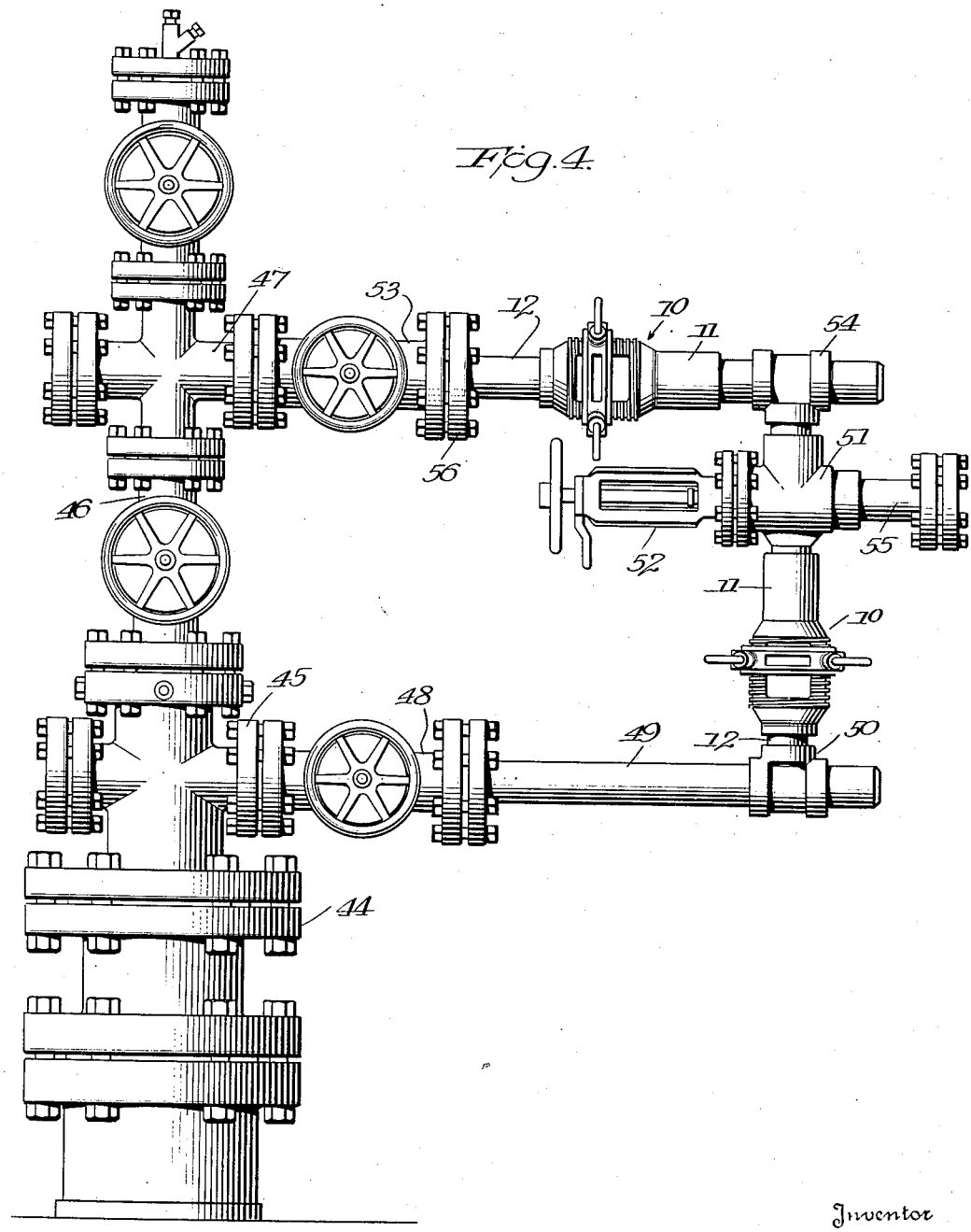
Figure 4 is an elevation of a well head installation involving the use of two of the new couplings.

Referring first to Figures 1 to 3, the coupling generally designated at 10 comprises partially telescoped tubular member 11 and 12.

The tubular member 11 includes an upper cylindrical portion 13 and a lower cylindrical portion 14 of larger diameter. As here shown, the upper extremity of portion 14 is provided with internal threads 15 to enable it to be joined with a threaded pipe end. Below the threaded zone 15 is an annularly enlarged chamber 16 bounded downwardly by an annular rib 17. Below the rib 17 is an annular cavity 18 provided with threads 19. Below the threaded zone 19 is an enlarged bore 20 provided at its lower extremity with internal threads 21.

The cylindrical portion 14 is provided with diametrically opposite openings 22 and 23 which have the vertically extending parallel edges 24, 25 and 26, 27, respectively. Externally, portion 14 is provided with the threads 28.

The member 12 is provided at its lower extremity with external threads 12' engageable in the ordinary coupling member. The upper end of member 12 is in the chamber 16, being guided by the rib 17. Below the rib is an annular packing 29 which is compressed by a gland nut 30 engaged with threads 19. A cap 31 has an externally threaded skirt 32 engaged with the threads 21. The end wall of the cap has an opening slidably receiving member 12. The skirt 32 is spaced outwardly of member 12 to provide a chamber receiving an annular packing 33 which is compressed by a gland nut 34.

Medially, member 12 is provided with radially projecting threads 35 which are engaged in the threaded opening of a plate 36 in the nature of a cross-head, this plate having parallel edges spaced apart only slightly less than the space between the side walls of openings 22 and 23. The ends of the cross-head 36 project through the said openings and are rounded on an arc struck from the axis of the coupling unit. One end of the cross-head, as here shown, is provided with a threaded radial bore in which is engaged a screw 37 whose inner end may be set in a recess 38 in member 12 to lock the latter and the cross-head positively against relative rotation.

Engaged with the threads 28 of member 14 is a nut 39 provided with radially projecting operating handles 40. The nut has an internal annular recess 41, which receives the end portions of the cross-head 36 with a sliding fit. The nut has diametrically opposite openings 42 and 43 whose width is slightly greater than that of the cross-head.

Since the ends of the cross-head are engaged in the recess 41 of the nut, and since the cross-head is fixed to member 12, it will be evident that when the nut is screwed up or down member 12 will be forced to follow it. Engagement of the cross-head with the lateral edges of the openings 22 and 23 positively restrains member 12 from rotation with the nut.

In assembling, the packing 29 is placed in recess 18 and nut 30 is engaged, to some extent, with threads 19. Nut 39 is engaged with threads 28 and the cross-head is inserted through one of the other of openings 42 and 43. Member 12 may now be inserted through the cross-head, gland nut and packing and turned relative to the cross-head to engage the threads 35 with the latter, whereupon screw 37 may be turned to position. The cap, with the packing 33 and nut 34, may now be slipped over the end of member 12 and engaged with threads 21. Gland nuts 30 and 34 are tightened to compress the packings and the coupling is ready for use.

It will be evident that unless nut 39 is being turned, it serves to positively secure members 11 and 12 against relative longitudinal movement and this is a feature of importance where high pressures, as in oil well installations, are encountered.

In Figure 4 the installation comprises a casing head 44 with a flanged casing outlet 45, the head being surmounted by a Christmas tree 46, including a cross having an arm 47 above the outlet 45. The outlet line for the casing includes a valve 48 and an angle 49, the latter including a fitting 50 in which is engaged the threaded end 12' of a coupling 10. The internal threads 15 of coupling member 11 are engaged with the threaded end of a T-fitting 51, here shown as forming a part of a choke valve 52.

The tubing outlet is connected through a valve 53 and a coupling 10 with an angle fitting 54, which is joined to the fitting 51 opposite the first coupling. A common outlet from the choke valve is provided at 55. The member 12 of the top coupling 10, as here shown, is threaded into a coupling flange 56 in order to be engageable with a similar flange of the valve 53.

It will be understood that variations in vertical distance between the head outlets are readily taken care of by the vertically disposed coupling 10, horizontal discrepancies being provided for by adjustment of the horizontally disposed coupling 10. The installation has been completed with standard parts, due to the adjustability of the couplings.

It will be understood that the application of the new couplings is by no means confined to well head installation and the showing of Figure 4 is merely given by way of example. Also, variations in form and relation of the coupling parts may be made without departure from the invention as defined in the following claims.

I claim:

1. A variable length pipe coupling comprising a pair of tubular members of which one is partially telescoped with the other with a fluid-tight sliding fit, a nut threaded on the outer of said members for travel in a longitudinal direction thereof, said outer member having a side opening therein, and means fixed on the inner member and engaging said nut through said opening whereby said inner member is caused to follow said nut.

2. A variable length pipe coupling comprising a pair of tubular members of which one is partially telescoped within the other with a fluid-tight sliding fit, the outer member having opposite side openings and being provided with external threads interrupted by said openings, a nut engaged with said threads, and a cross-head having a central opening in which the inner member is received and releasably secured, said cross-head having portions projecting through said openings and said nut having an internal annular groove receiving the projecting portions of said cross-head so that said inner member is caused to follow the travel of the nut, the nut having a radial slot through which the cross-head is insertable to position.

3. A coupling comprising a tubular member having a cylindrical passage including an enlarged portion at one end, a packing at the inner end of said enlarged portion, said packing including a gland nut inserted to position through said enlarged portion, a cap secured to the outer end of said enlarged portion, said cap having an end wall provided with an opening and carrying a packing including a gland nut, a second tubular member slidably received in said packings and having an end projecting outwardly of the first member, and adjusting means including means carried by the first tubular member operable to impart positive longitudinal relative movement to the second tubular member, said adjusting means serving to positively hold said members in adjusted position.

4. Structure according to claim 3, wherein the reciprocating means includes a nut threaded on the outside of the first member in the zone of said enlarged passage portion.

5. Structure according to claim 3, wherein the first member is provided with a side opening in the zone of said enlarged passage portion, and wherein the means for reciprocating the second member includes a nut threaded on said body, and means secured to said second member and projecting through said opening and engaged by said nut.

6. A variable length pipe coupling comprising a pair of tubular members of which one is partially telescoped within the other, packing means providing a seal between said members, and adjusting means including means carried by one of said members operable to impart positive longitudinal relative movement to the other member, said adjusting means serving to positively hold said members in adjusted position and to prevent relative rotation of said members.

JOHN R. YANCEY.